(12) United States Patent
Parsons

(10) Patent No.: US 11,602,123 B1
(45) Date of Patent: Mar. 14, 2023

(54) DOG BLANKET FOR PLAY AND SLEEP

(71) Applicant: Mary Louise Parsons, Charleston, SC (US)

(72) Inventor: Mary Louise Parsons, Charleston, SC (US)

( * ) Notice: Subject to any disclaimer, the term of this patent is extended or adjusted under 35 U.S.C. 154(b) by 40 days.

(21) Appl. No.: 16/821,659

(22) Filed: Mar. 17, 2020

(51) Int. Cl.
*A01K 29/00* (2006.01)
*A01K 1/035* (2006.01)
*A01K 15/02* (2006.01)

(52) U.S. Cl.
CPC .......... *A01K 1/0353* (2013.01); *A01K 15/026* (2013.01)

(58) Field of Classification Search
CPC .. A01K 1/0353; A01K 15/026; A01K 15/025; A01K 15/02
See application file for complete search history.

(56) References Cited

U.S. PATENT DOCUMENTS

| | | | |
|---|---|---|---|
| 4,634,618 A | 1/1987 | Greer et al. | |
| 4,654,906 A | 4/1987 | Roberts | |
| 4,742,799 A * | 5/1988 | Schlitz | A01K 15/025 119/707 |
| 5,167,565 A | 12/1992 | Metcalf | |
| 6,427,265 B1 | 8/2002 | Dix | |
| 6,557,494 B2 * | 5/2003 | Pontes | A01K 15/025 119/702 |
| 6,684,422 B2 | 2/2004 | LeFevre et al. | |
| 6,805,076 B2 | 10/2004 | Duffy et al. | |
| 9,043,991 B2 * | 6/2015 | Simon | A01K 1/0353 |
| D773,750 S | 12/2016 | Tucker Wilhelm | |
| D828,650 S | 9/2018 | Comerford | |
| 2011/0197818 A1 * | 8/2011 | Simon | A01K 1/0353 119/28.5 |
| 2014/0165923 A1 * | 6/2014 | Diamond | A01K 1/0353 119/706 |
| 2016/0286761 A1 * | 10/2016 | Ruckel | A01K 15/02 |
| 2017/0094944 A1 * | 4/2017 | Knight | A01K 15/026 |
| 2018/0008886 A1 * | 1/2018 | Espensen | A63F 9/0601 |
| 2020/0337269 A1 * | 10/2020 | Jeong | A01K 15/025 |

* cited by examiner

*Primary Examiner* — Trinh T Nguyen
(74) *Attorney, Agent, or Firm* — Bryan L. Loeffler, Esq.; Loeffler IP Group, P.A.

(57) ABSTRACT

A dog blanket (1) having one or more chewable objects (3) integrated into a body (2) of the dog blanket to occupy and comfort a dog while sleeping and while at play.

4 Claims, 3 Drawing Sheets

DOG BLANKET FOR PLAY AND SLEEP

FIELD OF THE INVENTION

This invention relates to pet toys and pet sleep aids and more particularly a dog blanket having one or more chewable objects integrated into a body of the dog blanket to occupy and comfort a dog while sleeping or playing.

BACKGROUND OF THE INVENTION

Most dog toys are specifically designed for dogs to chew on and tear at. Conventional dog toys include dog bones, halls, ropes, squeaky toys, frisbees, plush toys, and sticks.

Conventional dog toys serve different purposes. For example, puppies require toys they can chew on when they are teething. Toys also encourage exercise, stimulate dogs' minds, discourage problem behavior resulting from boredom and excess energy, and promote dental health.

There are a ide variety of dog toys on the market that are designed specifically for chewing, however, there are no conventional dog toys that also offer the comfort of a blanket to further occupy and calm a dog.

While toys provide active entertainment to dogs, blankets provide dogs comfort and help them relax. Blankets assist in maintaining a dog's body temperature while sleeping and reducing anxiety from stressful events, such as thunderstorm.

Therefore, a need exists for a dog blanket having one or more chewable objects integrated into a body of the dog blanket to occupy and comfort a dog while sleeping or playing.

The relevant prior art includes the following references:

| Pat. No. | Inventor | Issue/Publication Date |
|---|---|---|
| (U.S. Patent References) | | |
| 4,634,618 | Greer et al. | Jan. 6,1987 |
| 5,167,565 | Metcalf | Dec. 1, 1992 |
| 6,427,265 | Dix | Aug. 6, 2002 |
| D773,750 | Tucker Wilhelm | Dec. 6, 2016 |
| D828,650 | Comerford | Sep. 11, 2018 |
| 4,654,906 | Roberts | Apr. 7, 1987 |
| 6,684,422 | LeFevre et al. | Feb. 3, 2004 |
| 6,805,076 | Duffy et al. | Oct. 19, 2004 |
| (Non-Patent Literature) | | |

Hound Games Doggy Play Mat
Sniffiz Dog Mat
Taggies Play Toys

Non-Patent Literature

Hound Games Doggy Play Mat
Sniffiz Dog Mat
Taggies Play Toys

SUMMARY OF THE INVENTION

The primary object of the present invention is to provide a dog blanket having one or more chewable objects integrated into a body of the blanket to occupy and comfort a dog while sleeping or playing.

The present invention fulfills the above and other objects by providing a dog blanket with a body formed from at least two panels wherein a first panel and a second panel are secured together around a perimeter edge of the body to form an interior space between an inner surface of the first panel and the inner surface of the second panel. At least one chewable object is located between the first panel and the second panel and secured to the inner surface of the first panel and/or the inner surface of the second panel, thereby preventing the at least one chewable object from moving within the interior space of the body of the dog blanket.

The at least one chewable object is preferably located directly adjacent to the perimeter edge and/or corner of the blanket to allow a dog to easily place the perimeter edge of the dog blanket and the at least one chewable object in his or her mouth while still laying on the blanket. This also allows the dog to lay comfortably on the body of the dog blanket without interference from the at least one chewable object.

The at least one chewable object may be a chew toy, a squeaky toy, a crinkle toy and so forth or any equivalent object that is attachable to an inner surface of the first panel and/or second panel and is chewable and that preferably emits noise when chewed. The location of the at least one chewable object within the dog blanket may be identified by indicia located on an outer surface of the first panel and/or the second panel. For example, a symbol for a dog bone, dog paw and so forth may be printed or embroidered on an outer surface of the first panel and/or another surface of the second panel to indicate the location of at least one chewable object that is in a fixed position within the body of the dog blanket.

The above and other objects, features and advantages of the present invention should become even more readily apparent to those skilled in the art upon a reading of the Page following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
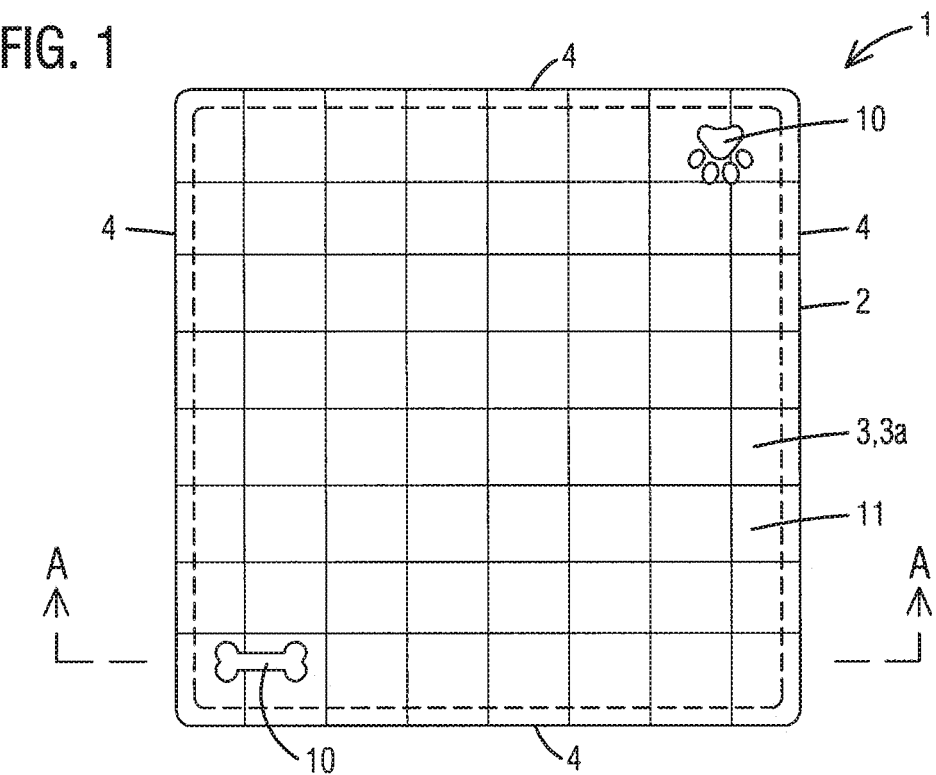
FIG. 1 is a top view of the dog blanket of the present invention.
Figure 2:
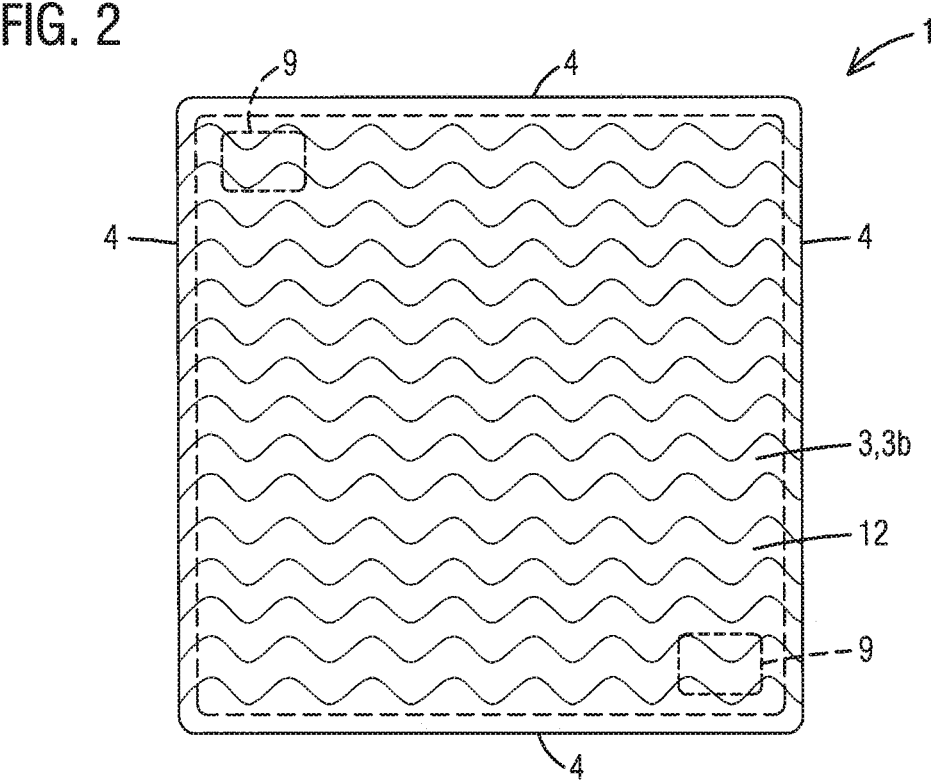
FIG. 2 is a bottom view of the dog blanket of the present invention.

For purposes of describing the preferred embodiment, the terminology used in reference to the numbered accessories in the drawings is as follows:

1. dog blanket, generally
 2. body
 3. panel
 3a. first panel
 3b. second panel
 4. perimeter edge
 5. interior space
 6. inner surface of first panel
 7. inner surface of second panel 8. chewable object
9. attachment means
10. indicia
11. outer surface of first panel
12. outer surface of second panel With reference to FIGS. 14, various views of a dog blanket 1 of the present invention are illustrated. The dog blanket 1 comprises a body 2 having at least two panels 3 wherein a first panel 3*a* and a second panel 3*b* are secured together around a perimeter edge 4 of the body 2 to form an open interior space 5 between an inner surface 6 of the first panel 3*a* and the inner surface 7 of the second panel 3*b*. The at least two panels 3 are preferably a flexible cloth material, such as plain cloth, flannel, fleece and so forth and may be reinforced to withstand tearing and ripping. At least one chewable object 8 is located between the first panel 3*a* and the second panel 3*b* and secured to the inner surface 6 of the first panel 3*a* and/or the inner surface 7 of the second panel 3*b* via an attachment means 9, such as threading, adhesive, a hemmed pocket and so forth, thereby preventing the at least one chewable object 8 from moving within the body 2 of the dog blanket.

The at least one chewable object 8 may be a chew toy, a squeaky toy, a crinkle toy and so forth or any equivalent object that is attachable to an inner surface 6 of the first panel 3*a* and/or the inner surface 7 of the second panel 3*b* and is chewable and that preferably emits noise when chewed. The location of the at least one chewable object 8 within the dog blanket 1 may be identified by indicia 10 located on an outer surface 11 of the first panel 3*a* and/or an outer surface 12 of the second panel 3*b*. For example, the indicia 10 may comprise a symbol for a dog bone, dog paw and so forth and may be printed or embroidered on outer surface 11 of the first panel 3*a* and/or an outer surface 12 of the second panel 3*b* to indicate the location of at least one chewable object 8 that is in a fixed position within the body 2 of the dog blanket 1.

Figure 3:
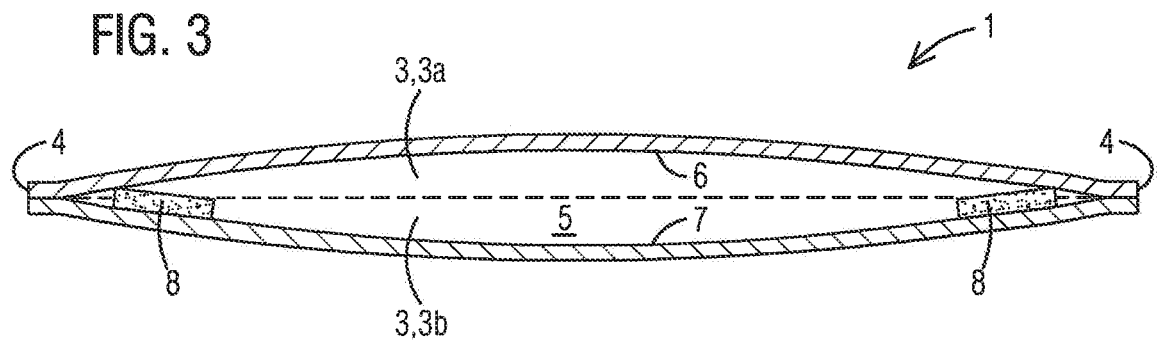
FIG. 3 is a sectional view along line A-A of FIG. 1 of the dog blanket of the present invention showing chewable objects located therein.
Figure 4:
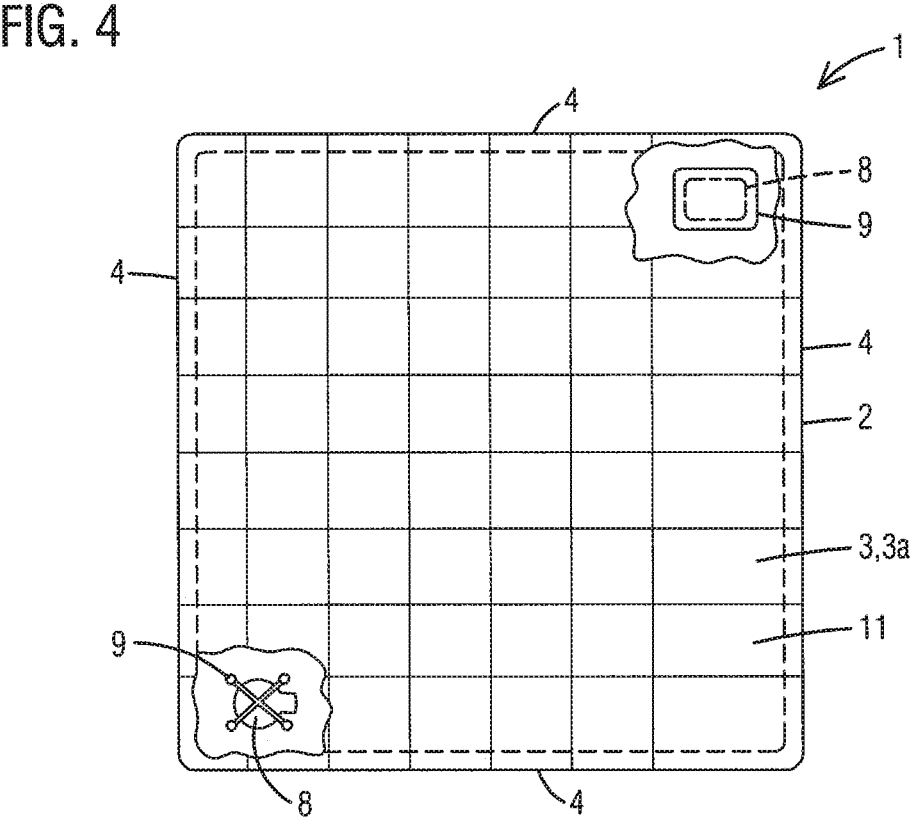
FIG. 4 is a partial cutaway view of the dog blanket of the present invention showing chewable objects located therein.
Figure 5:
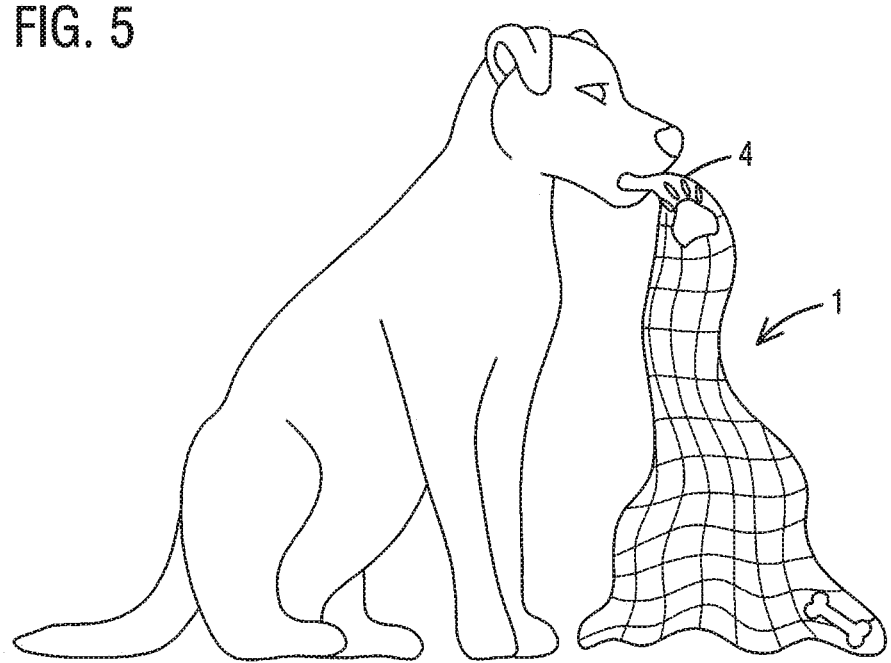
FIG. 5 is a side view of a dog blanket of the present invention in use being carried by a dog.
Figure 6:
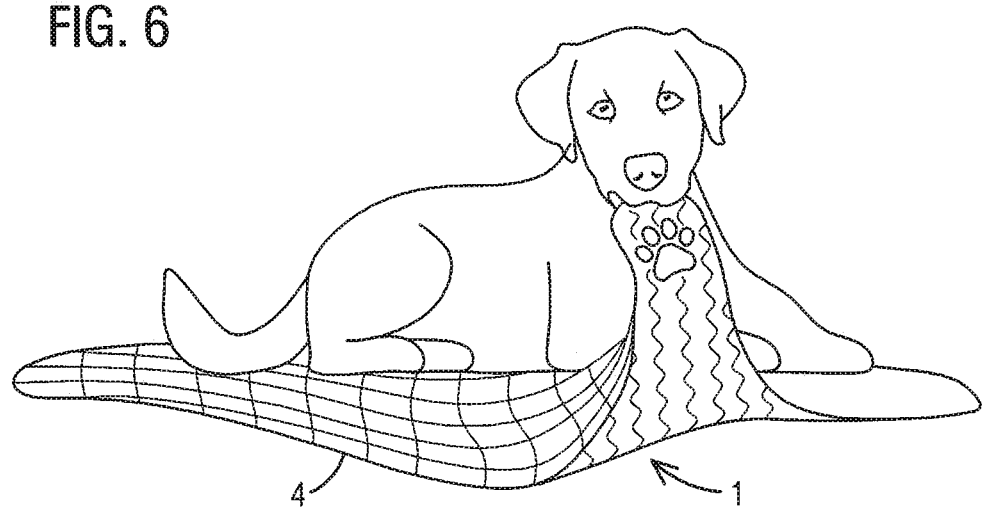
FIG. 6 is a side view of the dog blanket of the present invention in use being laid on by a dog.

With reference to FIGS. 5 and 6, a side view of the dog 1 blanket of the present invention in use being carried and laid on, respectively, by a dog is illustrated. The at least one chewable 8 object, as illustrated in FIGS. 3 and 4, is preferably located directly adjacent to the perimeter edge 4 of the dog blanket 1 and/or in a corner of the dog blanket 1 to allow a dog to easily place the perimeter edge of the dog blanket 1 and the at least one chewable object 8 in his or her mouth while carrying the dog blanket 1, as illustrated in FIG. 5, or when laying on the dog blanket 1, as illustrated in FIG. 6. This also allows the dog to lay comfortably on the body of the dog blanket 1 without interference from the at least one chewable object 8.

It is to be understood that while a preferred embodiment of the invention is illustrated, it is not to be limited to the specific form, or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A dog blanket comprising:
a body formed from two panels wherein a first panel and a second panel are secured together by sewing around an entire perimeter edge of the body to form an open interior space between an inner surface of the first panel and an inner surface of the second panel;
a chewable object located between the first panel and the second panel wherein said chewable object is secured to the inner surface of the first panel directly adjacent to the perimeter edge of the body;
said chewable object being attached to the inner surface of the first panel in a fixed position directly adjacent to the perimeter edge of the body by a permanent attachment means wherein the chewable object is prevented from moving within the open interior space of the body; and
wherein said perimeter edge of the body is entirely sealed by said sewing to prevent access to the open interior space between the inner surface of the first panel and the inner surface of the second panel.

2. The dog blanket of claim 1 wherein:
said at least one chewable object is a chew toy.

3. The dog blanket of claim 1 wherein:
said at least one chewable object is a squeaky toy.

4. The dog blanket of claim 1 wherein:
said at least one chewable object is a crinkle toy.

* * * * *